US009077772B2

(12) United States Patent
Hui et al.

(10) Patent No.: US 9,077,772 B2
(45) Date of Patent: Jul. 7, 2015

(54) SCALABLE REPLAY COUNTERS FOR NETWORK SECURITY

(75) Inventors: Jonathan W. Hui, Foster City, CA (US); Anjum Ahuja, Pearland, TX (US); Krishna Kondaka, Los Altos, CA (US); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 13/451,897

(22) Filed: Apr. 20, 2012

(65) Prior Publication Data

US 2013/0283347 A1 Oct. 24, 2013

(51) Int. Cl.
| G06F 7/04 | (2006.01) |
| H04L 29/14 | (2006.01) |
| H04L 29/08 | (2006.01) |
| H04L 29/06 | (2006.01) |
| G06F 15/16 | (2006.01) |

(52) U.S. Cl.
CPC .............. *H04L 69/40* (2013.01); *H04L 67/12* (2013.01); *H04L 63/0846* (2013.01)

(58) Field of Classification Search
CPC ...... H04L 69/40; H04L 63/0846; H04L 67/12
USPC .......................................................... 726/3
See application file for complete search history.

(56) References Cited

U.S. PATENT DOCUMENTS

| 7,171,555 B1 | 1/2007 | Salowey et al. |
| 7,181,530 B1 | 2/2007 | Halasz et al. |
| 7,243,143 B1 * | 7/2007 | Bullard .......................... 709/223 |
| 7,342,906 B1 | 3/2008 | Calhoun |
| 7,426,636 B1 * | 9/2008 | McGrew et al. .............. 713/160 |
| 7,555,783 B2 | 6/2009 | Enright |

(Continued)

FOREIGN PATENT DOCUMENTS

WO WO-2007111721 A2 10/2007

OTHER PUBLICATIONS

"Validation and Verification of IEEE 1588 Annex K", Bernd Hirschler and Albert Treytl Institute for Integrated Sensor Systems, Aug. 2011.*

(Continued)

*Primary Examiner* — Ashok Patel
*Assistant Examiner* — Gary Gracia
(74) *Attorney, Agent, or Firm* — Parker Ibrahim & Berg LLC; James M. Behmke; Kenneth J. Heywood (57) ABSTRACT

In one embodiment, an authenticator in a communication network maintains a persistent authenticator epoch value that increments each time the authenticator restarts. The authenticator also maintains a persistent per-supplicant value for each supplicant of the authenticator, each per-supplicant value set to a current value of the authenticator epoch value each time the corresponding supplicant establishes a new security association with the authenticator. To communicate messages from the authenticator to a particular supplicant, each message uses a per-supplicant replay counter having a security association epoch counter and a message counter specific to the particular supplicant. In particular, the security association epoch counter for each message is set as a difference between the authenticator epoch value and the per-supplicant value for the particular supplicant when the message is communicated, while the message counter is incremented for each message communicated.

14 Claims, 8 Drawing Sheets

(56) References Cited

U.S. PATENT DOCUMENTS

| | | | |
|---|---|---|---|
| 7,558,960 | B2 | 7/2009 | Cam Winget et al. |
| 7,562,224 | B2 | 7/2009 | Krischer et al. |
| 7,631,347 | B2 | 12/2009 | Cam-Winget et al. |
| 7,640,430 | B2 | 12/2009 | Zhou et al. |
| 7,760,710 | B2 | 7/2010 | Halasz et al. |
| 7,793,336 | B2 | 9/2010 | Salowey et al. |
| 8,107,396 | B1 | 1/2012 | Sharma |
| 8,332,526 | B2 * | 12/2012 | Kruse et al. ............... 709/230 |
| 2004/0255033 | A1 * | 12/2004 | Edney et al. ............... 709/229 |
| 2005/0086465 | A1 | 4/2005 | Sapkota et al. |
| 2006/0271697 | A1 * | 11/2006 | Kruse et al. ............... 709/230 |
| 2007/0076650 | A1 * | 4/2007 | Manjeshwar et al. ....... 370/328 |
| 2007/0088972 | A1 * | 4/2007 | Srivastava et al. ............ 714/4 |
| 2007/0224986 | A1 * | 9/2007 | Bakshi et al. ............... 455/436 |
| 2007/0288997 | A1 * | 12/2007 | Meier et al. .................. 726/4 |
| 2008/0004019 | A1 * | 1/2008 | Grilli et al. .............. 455/435.2 |
| 2008/0137853 | A1 * | 6/2008 | Mizikovsky et al. ........ 380/247 |
| 2008/0228919 | A1 | 9/2008 | Doshi et al. |
| 2008/0295144 | A1 | 11/2008 | Cam-Winget et al. |
| 2008/0301429 | A1 * | 12/2008 | Santanu et al. .............. 713/150 |
| 2009/0097399 | A1 * | 4/2009 | Mahasoom et al. ......... 370/216 |
| 2009/0125548 | A1 * | 5/2009 | Moir et al. ............. 707/103 R |
| 2009/0147702 | A1 * | 6/2009 | Buddhikot et al. .......... 370/255 |
| 2009/0262642 | A1 * | 10/2009 | van Greunen et al. ...... 370/216 |
| 2009/0327736 | A1 * | 12/2009 | Cam-Winget et al. ....... 713/181 |
| 2010/0205442 | A1 * | 8/2010 | Han et al. .................... 713/171 |
| 2010/0306518 | A1 * | 12/2010 | Suryawanshi ................. 713/1 |
| 2011/0098069 | A1 * | 4/2011 | Son et al. ..................... 455/507 |
| 2011/0153840 | A1 * | 6/2011 | Narayana et al. ............ 709/227 |
| 2011/0194531 | A1 * | 8/2011 | Park et al. .................... 370/331 |
| 2011/0208953 | A1 * | 8/2011 | Solomon et al. ................ 713/2 |
| 2011/0299386 | A1 * | 12/2011 | Negoto et al. ................ 370/221 |
| 2012/0020202 | A1 * | 1/2012 | Liu et al. ..................... 370/216 |

OTHER PUBLICATIONS

Luk, et al., "MiniSec: A Secure Sensor Network Communication Architecture", 6th International Symposium on Information Processing in Sensor Networks, Apr. 25-27, 2007, pp. 479-488, Association for Computing Machinery, Cambridge, MA.

Maan, et al., "Vulnerability Assessment of AODV and SAODV Routing Protocols Against Network Routing Attacks and Performance Comparisons", Wireless Advanced (WIAD), IEEE, Jun. 2011, pp. 36-41.

Vinci, et al., "Notification of Transmittal of the International Search Report and the Written Opinion of the International Searching Authority, or the Declaration", Patent Cooperation Treaty, International Application No. PCT/US2013/037555, mailed Jul. 23, 2013, 12 pages, European Patent Office, Rijswijk, Netherlands.

Winter, et al., "RPL: IPv6 Routing Protocol for Low-Power and Lossy Networks", Internet Engineering Task Force, Request for Comments 6550, Mar. 2012, 158 pages.

\* cited by examiner

NON-VOLATILE DATA STRUCTURE 300

| AUTHENTICATOR EPOCH VALUE 310 | | |
|---|---|---|
| SUPPLICANT 315 | PER-SUPPLICANT VALUE 320 | PTK 325 |
| "A" | A's VALUE | PTK-A |
| "B" | B's VALUE | PTK-B |
| ⋮ | ⋮ | ⋮ |

| EVENT 505 | AUTHENTICATOR EPOCH 510 | A {PER-SUPPLICANT VALUE 515 | SA EPOCH 520 | MESSAGE COUNTER 525} | B {PER-SUPPLICANT VALUE 535 | SA EPOCH 540 | MESSAGE COUNTER 545} |
|---|---|---|---|---|---|---|---|
| AUTHENTICATOR STARTS | 0 | - | - | - | - | - | - |
| ESTABLISH SECURITY ASSOCIATION WITH A | 0 | 0 | - | - | - | - | - |
| MESSAGE TO A | 0 | 0 | 0 | 1 | - | - | - |
| MESSAGE TO A | 0 | 0 | 0 | 2 | - | - | - |
| AUTHENTICATOR RESTART | 1 | 0 | 1 | 0 | - | - | - |
| A SENDS ANOTHER MESSAGE | 1 | 0 | 1 | 1 | - | - | - |
| ESTABLISH SECURITY ASSOCIATION WITH B | 1 | 0 | 1 | 1 | 1 | 0 | 0 |
| MESSAGE TO B | 1 | 0 | 1 | 1 | 1 | 0 | 1 |
| MESSAGE TO A | 1 | 0 | 1 | 2 | 1 | 0 | 1 |
| AUTHENTICATOR RESTART | 2 | 0 | 2 | 0 | 1 | 1 | 0 |
| NEW SECURITY ASSOCIATION WITH A | 2 | 2 | 0 | 0 | 1 | 1 | 0 |
| 3 MESSAGES TO B | 2 | 2 | 0 | 0 | 1 | 1 | 3 |
| FOURTH MESSAGE TO B | 2 | 2 | 0 | 0 | 1 | 2 | 0 |
| MANY MORE TO B | 2 | 2 | 0 | 0 | 1 | 3 | 3 |
| NEXT MESSAGE TO B (REQUIRE NEW SECURITY ASSOCIATION) | 2 | 2 | 1 | 0 | 2 | 0 | 0 |
| AUTHENTICATOR RESTART | 3 | 2 | 0 | 0 | 2 | 1 | 0 |

TIME →

SCALABLE REPLAY COUNTERS FOR NETWORK SECURITY

TECHNICAL FIELD

The present disclosure relates generally to computer networks, and, more particularly, to security protocols for shared-media computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. Shared-media communication networks, such as wireless networks or power-line communication (PLC) networks (a type of communication over power-lines), provide an enabling technology for networking communication. These technologies can be used, for example, in advanced metering infrastructure (AMI) networks, and are also useful within homes and buildings.

Security is an important aspect of many shared-media networks, particularly for LLN solutions, which generally operate over a large physical area in an uncontrolled environment. Existing security protocols typically use a replay counter to ensure freshness of a message and prevent replay attacks. A replay counter is strictly monotonic. The message source must increase the replay counter for each new message. The message destination only accepts messages that have a larger replay counter than that of messages it has previously received. Current replay counter solutions, however, are not well-suited for constrained networks, such as LLNs, where devices are often limited in terms of communication bandwidth, processing capability, and/or memory/storage.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an authenticator in a communication network maintains a persistent authenticator epoch value that increments each time the authenticator restarts. The authenticator also maintains a persistent per-supplicant value for each supplicant of the authenticator, each per-supplicant value set to a current value of the authenticator epoch value each time the corresponding supplicant establishes a new security association with the authenticator. To communicate messages from the authenticator to a particular supplicant, each message uses a per-supplicant replay counter having a security association epoch counter and a message counter specific to the particular supplicant. In particular, the security association epoch counter for each message is set as a difference between the authenticator epoch value and the per-supplicant value for the particular supplicant when the message is communicated, while the message counter is incremented for each message communicated.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, which may include functionality for turning on/off an engine or performing any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Figure 1:
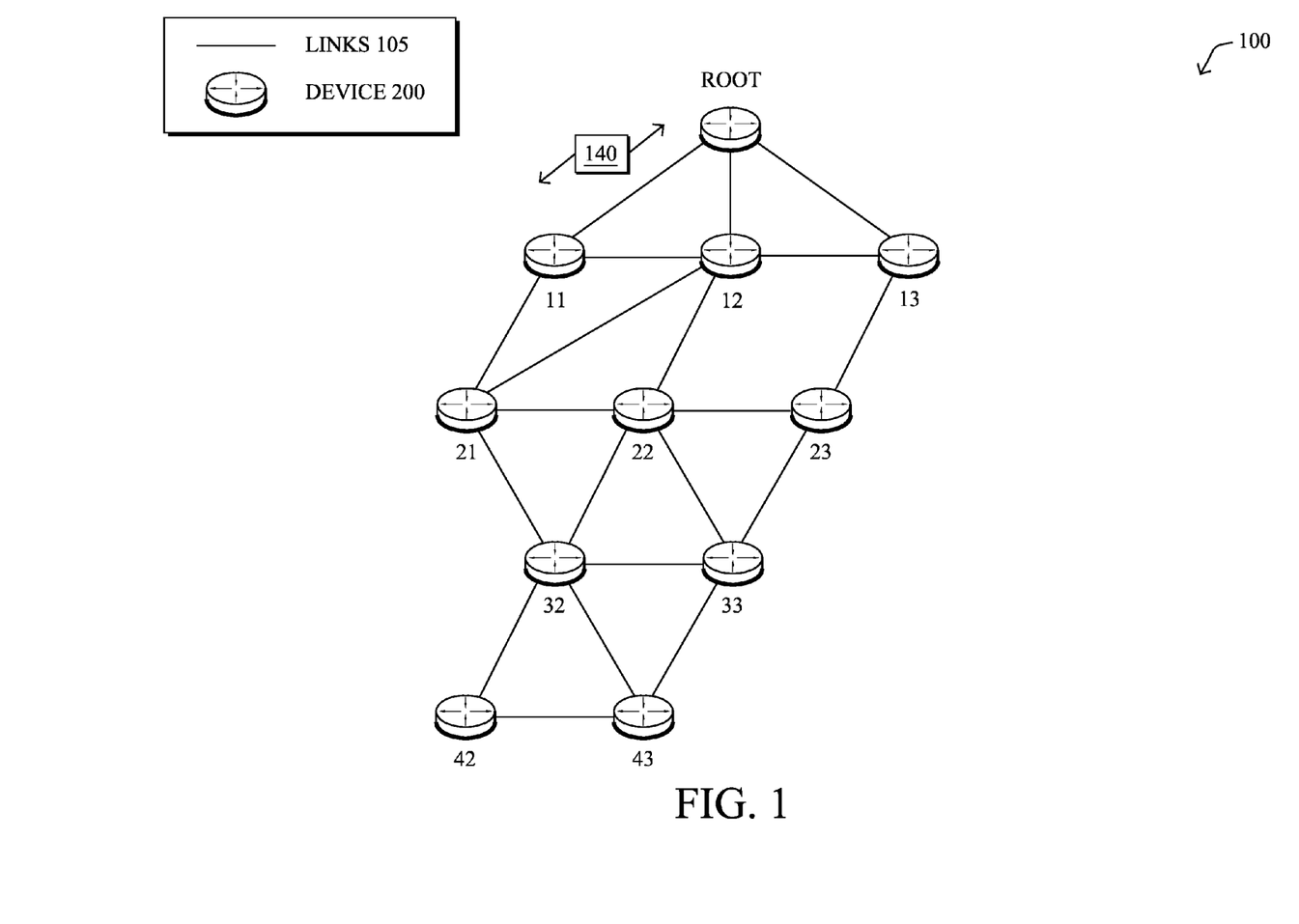
FIG. 1 illustrates an example communication network.

FIG. 1 is a schematic block diagram of an example computer network 100 illustratively comprising nodes/devices 200 (e.g., labeled as shown, "root," "11," "12," ... "43," and described in FIG. 2 below) interconnected by various methods of communication. For instance, the links 105 may be shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network 100, and that the view shown herein is for simplicity. Also, those skilled in the art will further understand that while the network 100 is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, IEEE Std. 802.11i, WiFi, Bluetooth®, etc.), PLC protocols, or other shared-media protocols where appropriate. In this context, a protocol includes a set of rules defining how the nodes interact with each other.

Figure 2:
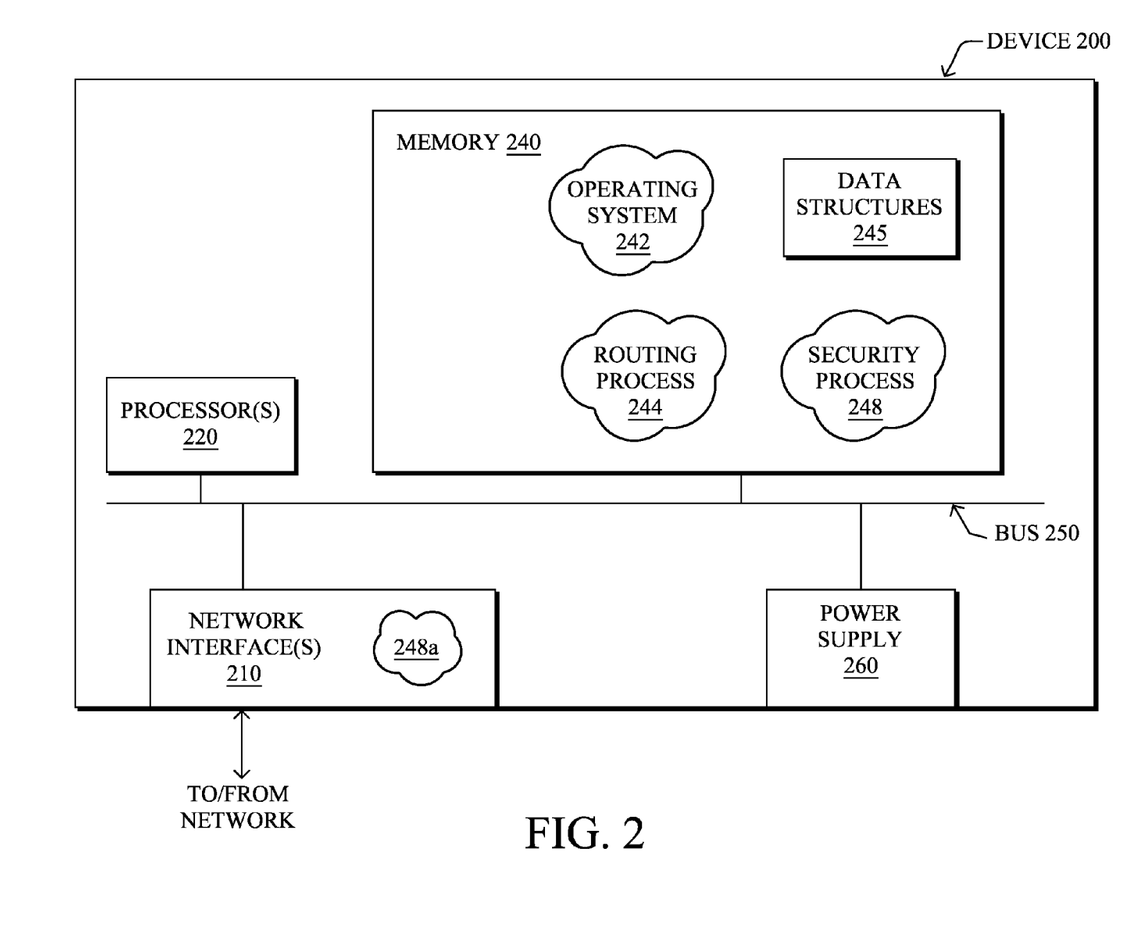
FIG. 2 illustrates an example network device/node.

FIG. 2 is a schematic block diagram of an example node/device 200 that may be used with one or more embodiments described herein, e.g., as any of the nodes shown in FIG. 1 above. The device 200 may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces 210 may be configured to transmit and/or receive data using one or more different communication protocols. Note, further, that the nodes 200 may have one or more different types of network connections 210, e.g., wireless and wired/physical connections, and that the view herein is merely for illustration. Also, while the network interface 210 is shown separately from power supply 260, in certain embodiments (e.g., PLC), the network interface 210 may communicate through the power supply 260, or may be an integral component of the power supply 260. In some specific configurations the PLC signal may be coupled to the power line feeding into the power supply 260.

The memory 240 comprises a plurality of storage locations that are addressable by the processor 220 and the network interfaces 210 for storing software programs and data structures associated with the embodiments described herein. Note that certain devices 200 may have limited memory or no memory (e.g., no memory for storage other than for is programs/processes operating on the device and associated caches). The processor 220 may comprise necessary elements or logic adapted to execute the software programs and manipulate the data structures 245. An operating system 242, portions of which are typically resident in memory 240 and executed by the processor 220, functionally organizes the device by, inter alia, invoking operations in support of software processes and/or services executing on the device 200. These software processes and/or services may comprise routing process/services 244 and an illustrative security process 248, as described herein, among other things. Note that while security process 248 is shown in centralized memory 240, alternative embodiments provide for the process 248 to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each is device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As noted above, security is an important aspect of many shared-media networks, particularly for LLN solutions, which generally operate over a large physical area in an uncontrolled environment. As an illustrative example, IEEE Std. 802.11 uses a hierarchical key-management architecture. Typically, network nodes in such an architecture perform mutual authentication using IEEE 802.1x, e.g., with Extensible Authentication Protocol-Transport Layer Security (EAP-TLS) as the authentication method. Though IEEE 802.1x is capable of utilizing any arbitrary key exchange algorithm, one particular example implementation may utilize the Ephemeral elliptic-curve Diffie-Hellman—Elliptic Curve Digital Signature Algorithm (ECDHE_ECDSA) key exchange algorithm. Upon successful authentication, the Field Area Router (FAR)/Authenticator and joining node mutually derive a Pairwise Master Key (PMK). Using the PMK, the FAR and joining node may use an IEEE Std. 802.11 4-way handshake to mutually derive a Pairwise Temporal Key (PTK) from the PMK. Using the PTK, the FAR may then securely communicate Group Temporal Key (GTK) information to the node. The same GTK information is communicated to all nodes that are allowed to access the network. The joining node then uses the GTK(s) to encrypt (decrypt) and sign (authenticate) all link-layer data frames communicated to neighboring nodes.

Whether or not a device possesses the current set of GTKs separates the insider devices from the outsider devices; that is, without possession of a valid GTK, an outsider device is not capable of participating in the network (and by using a network-wide GTK, the network supports efficient link-layer broadcast). By using pairwise keying information (PTK derived from PMK obtained from EAP-TLS), the FAR communicates the GTK to an individual device using a secure channel (potentially over multiple link hops in a LLN), irrespective of the current GTKs installed on existing devices. By using a secure pairwise channel (provided by the PTK), the FAR (authenticator) may communicate new GTK information to only those devices that are allowed to participate is in the network (supplicants). Each GTK refresh allows the FAR to define a new group membership. This mechanism allows the protocol to support perfect forward and backward secrecy.

Existing security protocols typically use a replay counter to ensure freshness of a message and prevent replay attacks. A replay counter is strictly monotonic. The message source must increase the replay counter for each new message. The message destination only accepts messages that have a larger replay counter than the replay counter of messages it has previously received. Current replay counter solutions, however, are not well-suited for constrained networks, such as LLNs, where devices are often limited in terms of communication bandwidth, processing capability, and/or memory/storage.

In particular, many existing methods require the source to increment the replay counter with each new message. While simple, this approach requires the sender and receiver to first synchronize (i.e., initialize) the replay counter. This is typically done when the sender and receiver first establish a security association. In IEEE Std. 802.11, for example, a 4-way handshake serves to initialize the Pairwise Temporal Key (PTK) and initialize the replay counter between the Authenticator and a Supplicant. The Authenticator uses the replay counter to communicate a new Group Temporal Key (GTK) to a Supplicant. Notably, security associations generally have a lifetime, after which the peers (supplicants) must reestablish a new security association. This "re-associating" occurs repeatedly over time for each supplicant device within the network.

In particular, initializing the replay counter incurs messaging overhead since devices must exchange some alternative information (i.e., "nonces" in 802.11) to ensure freshness. To remove the overhead of initializing replay counters, some existing protocols rely on pre-existing time synchronization between the sender and receiver. This approach requires a secure time synchronization mechanism. For cost reduction reasons, many LLN devices do not have a Real Time Clock (RTC) and, therefore, do not have a local trusted time source.

According to an illustrative example, an LLN (or other mesh network) may rely on a Field Area Router (FAR) (e.g., the root node in FIG. 1) to manage link-layer security is associations with every LLN device communicating through it. In this example, the FAR may act as the Authenticator, each authenticated device may serve as an Authenticator-Relay, and Supplicants can communicate through an Authenticator-Relay or directly with the Authenticator to conduct various security association establishment techniques, e.g., according to IEEE Std. 802.1x and/or IEEE Std. 802.11i.

LLNs generally operate with limited communication resources (e.g., tens of kbits/sec). Performing 4-way handshakes with every device in a LLN is thus a costly operation. Fortunately, under normal operation, 4-way handshakes may be relatively rare (e.g., once every few months). Furthermore, the Authenticator may spread the 4-way handshakes out over time.

However, care must be taken when the Authenticator reboots (e.g., due to a watchdog reset). If the replay counters are not persistently stored, the Authenticator loses the replay counter state and must perform 4-way handshakes with each device to distribute the GTK and grant access to the network. Alternatively, the Authenticator may persistently store the replay counter for each device. After a reboot, the FAR can then perform 2-way handshakes to distribute the GTK, reducing the 802.11i message overhead at network startup by half.

The challenge comes when dealing with the FAR's non-volatile storage capabilities. Like many LLN devices, a FAR typically contains a limited amount of flash to persistently store state. Flash is typically chosen because it is robust in harsh environments, low cost, and low power.

Unfortunately, a primary downside of flash is that it has a limited number of write cycles. An example LLN may require support of up to 5000 LLN devices per FAR. Each time the Authenticator sends a new message using a PTK, it must perform a flash write to save the new replay counter. Using existing write-cache techniques to batch flash writes is not desirable because it leaves open some time window for lost state whenever the FAR reboots while data in the write-cache has not been synced to flash. Increasing the size of the flash and using wear-leveling techniques by utilizing all parts of the flash can help alleviate the issue, but adds cost to the system.

Scalable Replay Counters

The techniques herein introduce the concept of epoch-based replay counters as a manner in which many (e.g. thousands) persistent replay counters may be managed. In certain embodiments, the techniques may eliminate the flash write problem described above, ensure that replay counters stay synchronized even after unexpected reboots, and maintain interoperability with existing protocols. Illustratively, and as described in greater detail below, this may be achieved by maintaining a single persistent Authenticator Epoch that increments each time the authenticator process (re)starts, storing the current Authenticator Epoch along with additional security association state when establishing a new security association, and by splitting a traditional Replay Counter space into a security association epoch and message counter.

Specifically, according to one or more embodiments of the disclosure as described in detail below, an authenticator in a communication network maintains a persistent authenticator epoch value that increments each time the authenticator restarts. The authenticator also maintains a persistent per-supplicant value for each supplicant of the authenticator, each per-supplicant value set to a current value of the authenticator epoch value each time the corresponding supplicant establishes a new security association with the authenticator. To communicate messages from the authenticator to a particular supplicant, each message uses a per-supplicant replay counter having a security association epoch counter and a message counter specific to the particular supplicant. In particular, the security association epoch counter for each message is set as a difference between the authenticator epoch value and the per-supplicant value for the particular supplicant when the message is communicated, while the message counter is incremented for each message communicated.

Illustratively, the techniques described herein may be performed by hardware, software, and/or firmware, such as in accordance with the security process 248/248a, which may include computer executable instructions executed by the processor 220 (or independent processor of interfaces 210) to perform functions relating to the techniques is described herein, e.g., particularly as an authenticator process. For example, the techniques herein may be treated as extensions to conventional communication protocols, such as the various wireless or PLC protocols (e.g., IEEE Std. 802.11i), and as such, may be processed by similar components understood in the art that execute those protocols, accordingly. Note also that while the embodiments describe the mechanisms as an adaptation of IEEE 802.11i, the concepts described herein are not specific to IEEE 802.11i, and the embodiments are not so limited.

Operationally, the techniques herein describe persistent management of replay counters, particularly suited for large numbers of replay counters. The techniques herein can minimize the number of writes that can exhaust the limited write-cycle capabilities of flash storage, and also can ensure that the replay counters between an Authenticator (e.g., a FAR) and many (e.g., thousands) Supplicants (e.g., LLN nodes) remain synchronized even after an unexpected reboot.

Figure 3:
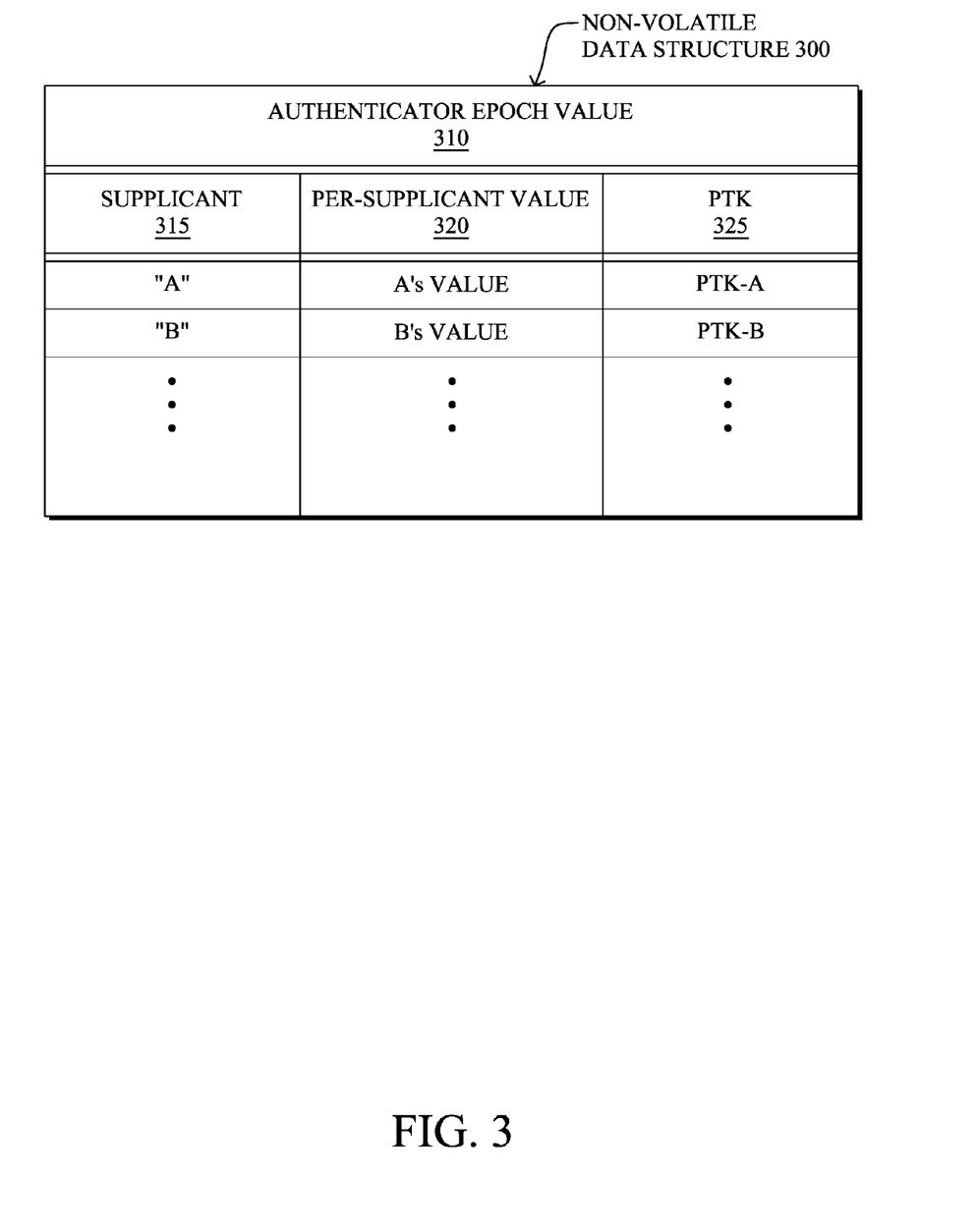
FIG. 3 illustrates an example non-volatile data structure.

A first component of the techniques described herein involves maintaining a single persistent authenticator epoch value (counter) on the authenticator. FIG. 3 illustrates an example non-volatile data structure 300 (e.g., a data structure 245 in FIG. 2 above). The data structure 300 includes an authenticator epoch value 310, which defines the current "incarnation" of the authenticator. In other words, the authenticator epoch indicates the number of times the authenticator process was (re)started (i.e., maintained by incrementing each time the authenticator restarts) on the authenticator. In particular, whenever the authenticator process starts (e.g., as part of the security process 248 or another process of the authenticator device 200), the authenticator reads the current authenticator epoch value 310 from non-volatile memory 300, increments it, and stores the new value in the non-volatile memory 300.

A second component of the techniques described herein involves managing each independent epoch-based replay counter persistently. In particular, the authenticator maintains, for each supplicant (entry 315), a persistent per-supplicant value 320 which is set to a current authenticator epoch value 310 each time the corresponding supplicant 315 establishes a new security association with the authenticator. In other words, whenever is the authenticator establishes a new security association (e.g., using a 4-way handshake in IEEE Std. 802.11i), it records the current authenticator epoch value 310 in the supplicant's session state block (e.g., field 320). Note that this process does not require any additional writes than what is required when establishing a new security association. In particular, the authenticator can store the current authenticator epoch value with the new/corresponding PTK 325 stored during each new security association for the supplicant.

Figure 4:
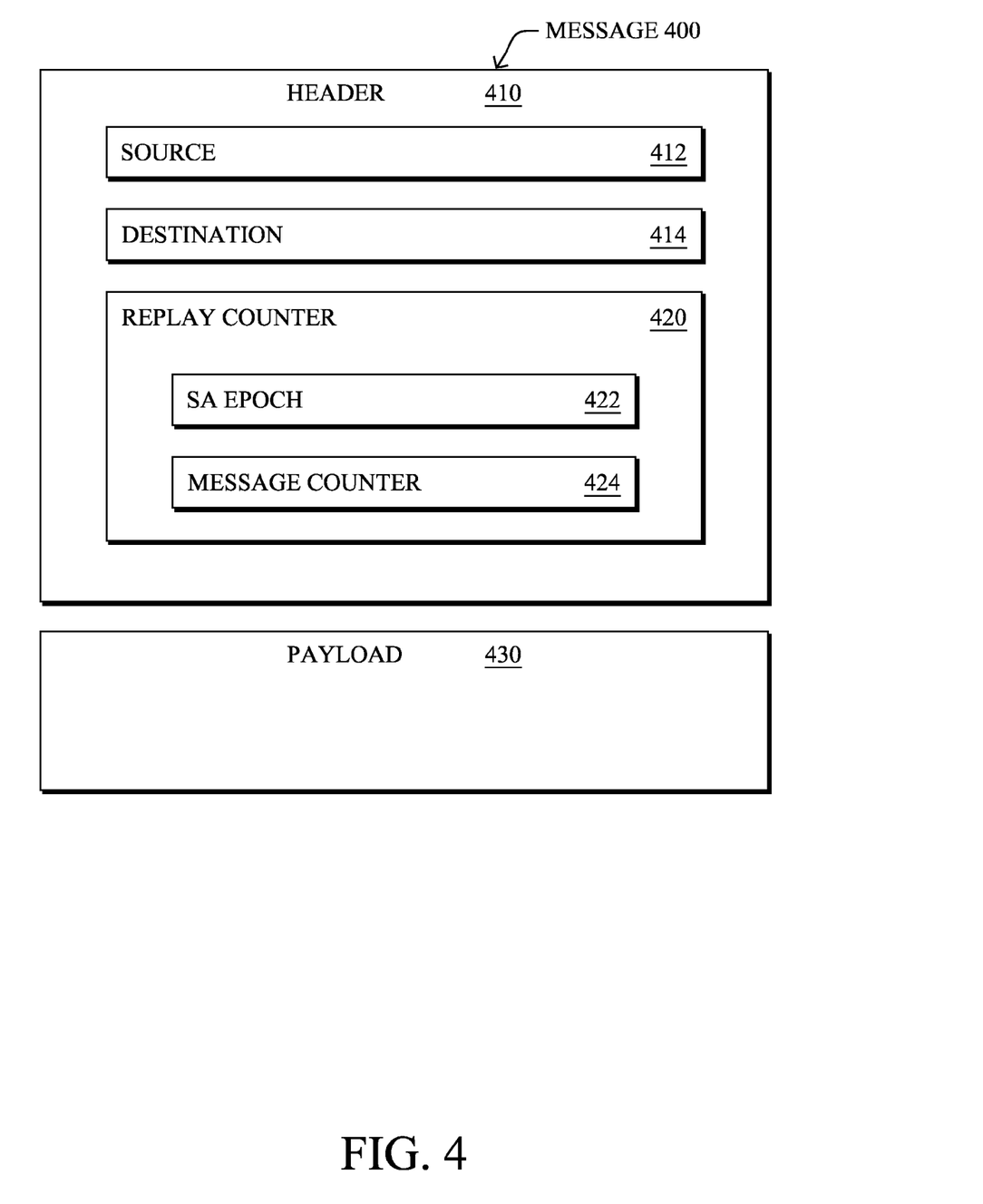
FIG. 4 illustrates an example message.

A third component of the techniques described herein involves splitting the traditional replay counter space of a message into (i) a security association (SA) epoch and (ii) a message counter. FIG. 4 illustrates an example simplified message 400 (e.g., packet 140) comprising a header 410 and payload 430. Within header 410 may be one or more various fields for directing the message 400, such as a source address 412 (e.g., of the authenticator) and a destination address 414 (e.g., of the supplicant). Additionally, as shown, a replay counter 420 is divided into the SA epoch counter 422 and message counter 424.

As described herein, the SA epoch 422 defines the number of times the authenticator process has (re)started since a new security association was established with the particular supplicant. (Note that the SA epoch value 422 for a particular supplicant is independent of all other supplicants.) That is, the SA epoch value 422 is initialized to zero when a new security association is established. Said differently, the SA epoch counter 422 for each message is set as a difference between the authenticator epoch value 310 and a per-supplicant value 320 for the particular supplicant 315 when the message is communicated. When there is no difference between the authenticator epoch value 310 and the per-supplicant value 320 for the particular supplicant 315, i.e., in response to establishing a new security association with the particular supplicant, then the SA epoch counter 422 is thus set to zero. If the SA epoch "rolls over" (increments past the maximum allowed number, e.g., from "1111" to "0000" for a 4-bit field), the authenticator must establish a new security association with the particular supplicant.

The message counter 424 of the replay counter 420 defines the number of is messages sent within the SA epoch of a security association, and may thus be incremented for each message communicated. In particular, the message counter 424 is initialized to zero at the start of each new SA epoch, and the authenticator increments the message counter for each new message, until rolling over, at which time the Authenticator starts a new SA epoch (i.e., incrementing the SA epoch counter 422) for the particular supplicant. Note that in an illustrative embodiment, incrementing the SA epoch counter 422 involves decrementing the per-supplicant value 320 for that supplicant and saving the value 320 persistently. In other words, the SA epoch is difference between the authenticator epoch value 310 and per-supplicant epoch value 320, so to increment the SA epoch counter 422 due to the message counter rolling over, there are two options:

1) Decrement the per-supplicant value 320 in non-volatile memory—which has the benefit of restricting any side-effects to a single supplicant; or
2) Increment the authenticator epoch value 310 in non-volatile memory—which has the benefit of resetting the message counter for all nodes, and further delaying any non-volatile memory writes.

In practice, the roll-over cases may be rare, given an illustrative 8-byte replay counter field (e.g., with 32 bits for the epoch counter and 32 bits for the message counter). In particular, in the illustrative IEEE Std. 802.11i, the Extensible Authentication Protocol over LAN (EAPOL) Key message contains an 8-byte replay counter field. In one embodiment, the replay counter field 420 may be split, with the four high bytes as the SA Epoch counter 422 and the four low bytes as the message counter 424.

Using the EAPOL-Key Replay Counter in this way results in very visible differences on the wire from a traditional implementation. In particular, the upper bits of the EAPOL-Key Replay Counter field will increment each time the authenticator process (re)starts and the lower bits will reset to zero. That is, when restarting the authenticator, is the authenticator epoch value 310 is incremented, and when a next message is communicated to a particular supplicant, the SA epoch counter 422 is set to the difference between the incremented authenticator epoch value 310 and the per-supplicant value 320 for the particular supplicant, and the message counter 424 is reset to zero. Note, however, that using the EAPOL-Key replay counter field in this way does not affect interoperability. In particular, the IEEE Std. 802.11 specification does not place any limits on how many times the authenticator may increment the replay counter field.

With persistent knowledge of the authenticator epoch 310, the authenticator does not need to perform any flash writes to maintain the EAPOL-Key replay counter values. Instead, the authenticator simply generates a per-supplicant replay counter when communicating each message to a particular supplicant. Specifically, when sending a message, the authenticator sets the SA epoch 422 to the difference between the current value of the authenticator epoch 310 and the authenticator epoch value that is stored for the supplicant, i.e., the per-supplicant value 320. Note that taking the simple difference naturally handles cases when the authenticator epoch value rolls over. In addition, the authenticator increments the message counter 424 for each new message. The message counter may thus be stored in volatile-memory and initialized to zero whenever the authenticator process (re)starts.

Figure 5:
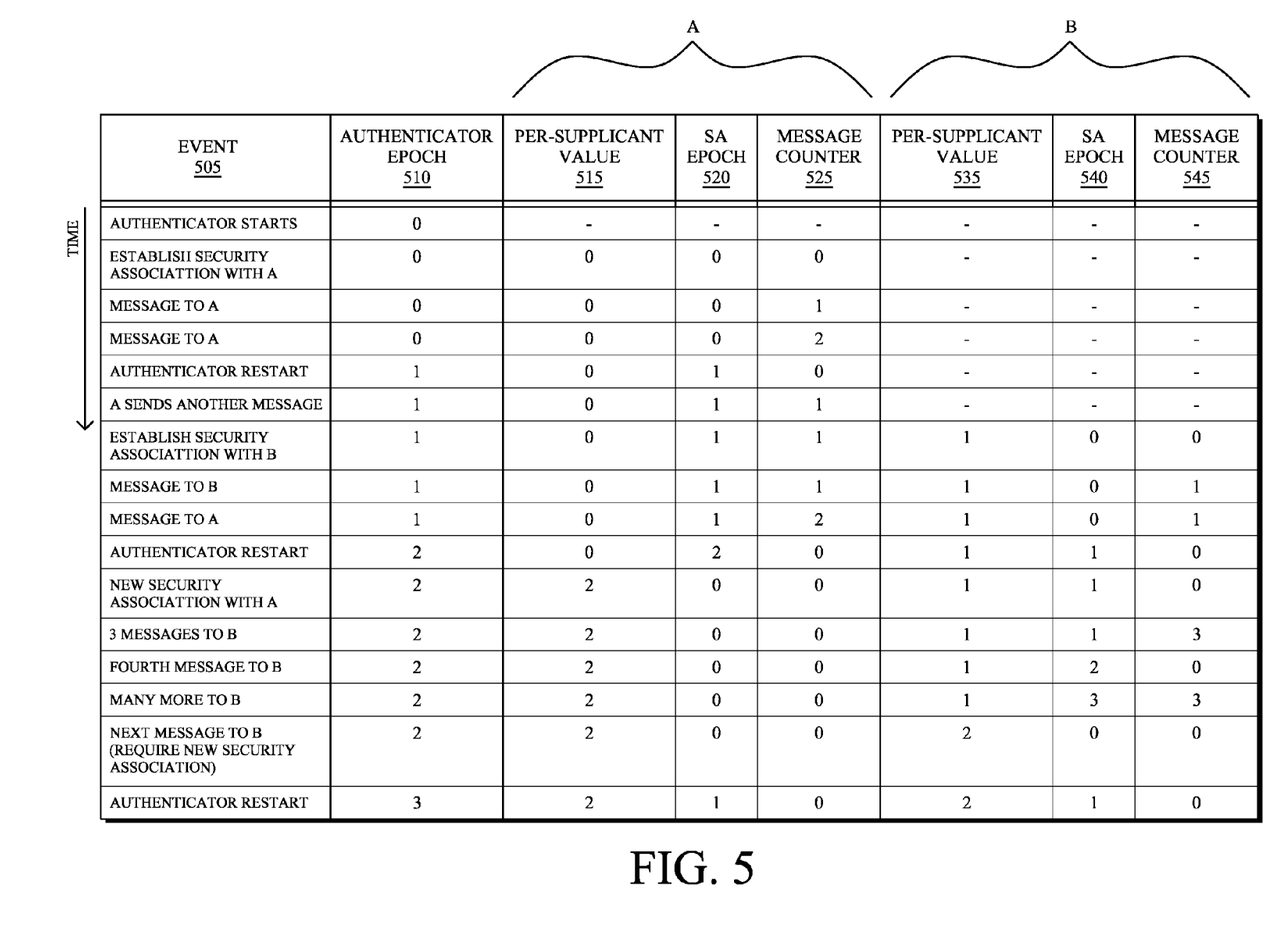
FIG. 5 illustrates an example of scalable replay counters for network security.

As an illustration of the details above, FIG. 5 shows an example of scalable replay counters for network security according to one or more embodiments herein. For instance, assume that a series of events 505 occur in the example order as shown, and the remaining fields represent the authenticator epoch value 510, and for each supplicant "A" and "B", a per-supplicant value 515/535, and the replay counter fields, namely the SA epoch counter 520/540, and a message counter 525/545.

Illustratively, when the authenticator starts, the authenticator epoch value 510 (310 above) may be initialized to zero (or, in alternative embodiments, initialized to 1), and then when supplicant "A" establishes a new security association, the per-supplicant value 515 for A is set as the current authenticator epoch. As messages are sent to A, the message counter 525 is incremented. In the event the authenticator restarts, then the is authenticator epoch value 510 is incremented to 1, and the SA epoch counter 520 for supplicant A is then set to the difference between the current authenticator epoch value 510 and its per-supplicant value 515, i.e., 1. As more messages are sent to A, the message counter 525 is incremented from its reset value of 0 due to the restart.

Assume now that supplicant B establishes a security association with the authenticator, at which time the per-supplicant value 535 for B is set to the current authenticator value, i.e., 1. Messages sent to B may then initialize their replay counter with an SA epoch counter 540 and message counter 545 initialized to 0. Note that additional messages to A increment their replay counter independently from supplicant B.

If there is another authenticator restart at this point, the authenticator epoch 510 is incremented to 2, the per-supplicant values 515 and 535 are maintained, and to send messages to the supplicants A and B, new SA epoch values 520 and 540 are computed as the resultant difference between the authenticator epoch 510 and respective per-supplicant values 515 and 535, i.e., 2 and 1, respectively.

Assume further that for various reasons supplicant A now establishes a new security association with the authenticator. At this time, the per-supplicant value 515 for A is set to the current authenticator epoch value 510, i.e., 2, and the SA epoch counter and message counter may each be reset to 0.

To illustrate rolling over, assume next that three messages are sent to supplicant B, incrementing the message counter 545 to 3. Under the simplified criteria of 2-bit counters, incrementing the message counter for the next (fourth) message would result in rolling over from binary 11 (value=3) to binary 00 (value=4). As such, the SA epoch counter 540 for supplicant B is incremented from 1 to 2. Assume that this continues for many more messages (e.g., six), such that the replay counter for B is 3 for the SA epoch and 3 for the message counter. When the next message is sent to B, the message counter 545 would roll over, thus incrementing the SA epoch counter 540. However, since the SA epoch counter would also roll over, a new security association is required with supplicant B, resulting in the per-supplicant value 535 being set to the authenticator is epoch value 510, and the replay counter fields 540 and 545 being each reset to 0.

As a last example, in the event the authenticator again restarts at this point, the authenticator epoch value 510 is incremented (to 3), the per-supplicant values 515 and 535 remain the same, the SA epoch counters are set to the difference (e.g., 1 and 1, respectively), and the message counters are reset to 0. Those skilled in the art will appreciate that the examples shown in FIG. 5 are simplified and merely for purposes of illustration, and are not meant to limit the scope of the embodiments herein.

By using epoch-based replay counters, the only additional persistent write operations required by the authenticator occurs when the authenticator process (re)starts to manage the authenticator epoch 310. Other than managing the per-supplicant values 320, the authenticator does not require any additional persistent write operations to maintain the replay counters for each supplicant. Furthermore, epoch-based replay counters ensure that the replay counter state between the authenticator and supplicant does not become inconsistent when the authenticator unexpectedly reboots. When the authenticator process restarts, it establishes a new SA Epoch for each supplicant, initializes the message counter to zero, and can begin sending messages using the current security association as if the authenticator had never restarted.

Figure 6:
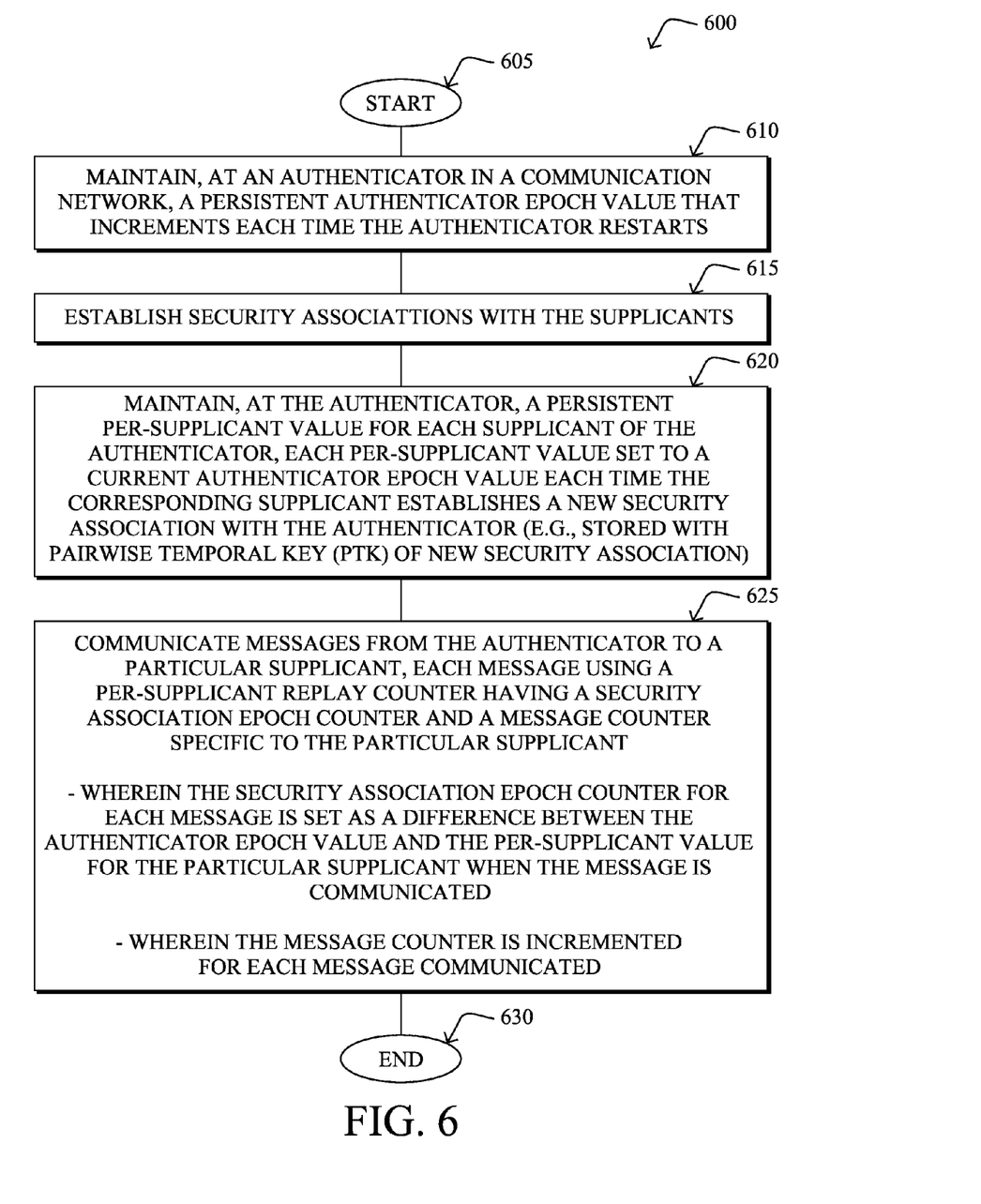
FIG. 6 illustrates an example simplified procedure for scalable replay counters for network security.

FIG. 6 illustrates an example simplified procedure for scalable replay counters for network security in accordance with one or more embodiments described herein. The procedure 600 may start at step 605, and continues to step 610, where, as described in greater detail above, an authenticator (e.g., FAR or root node) in a communication network maintains a persistent authenticator epoch value 310 that increments each time the authenticator restarts. In step 615, the authenticator establishes security associations with supplicants, and in step 620, maintains a persistent per-supplicant value 320 for each supplicant 315. As described above, each per-supplicant value is set to a current authenticator epoch value each time the corresponding supplicant establishes a new security association with the authenticator. As also mentioned above, the per-supplicant value may be stored, for example, with the PTK 325 of a new security association.

The authenticator may communicate messages 400 in step 625 to a particular supplicant, where each message uses a per-supplicant replay counter 420 having a security association epoch counter 422 and a message counter 424 specific to the particular supplicant. In particular, as described above, the security association epoch counter for each message is set as a difference between the authenticator epoch value and the per-supplicant value for the particular supplicant when the message is communicated, while the message counter is incremented for each message communicated. The procedure 600 may end in step 630, notably with the ability to continue sending messages, restarting the authenticator, establishing new security associations, etc.

Figure 7:
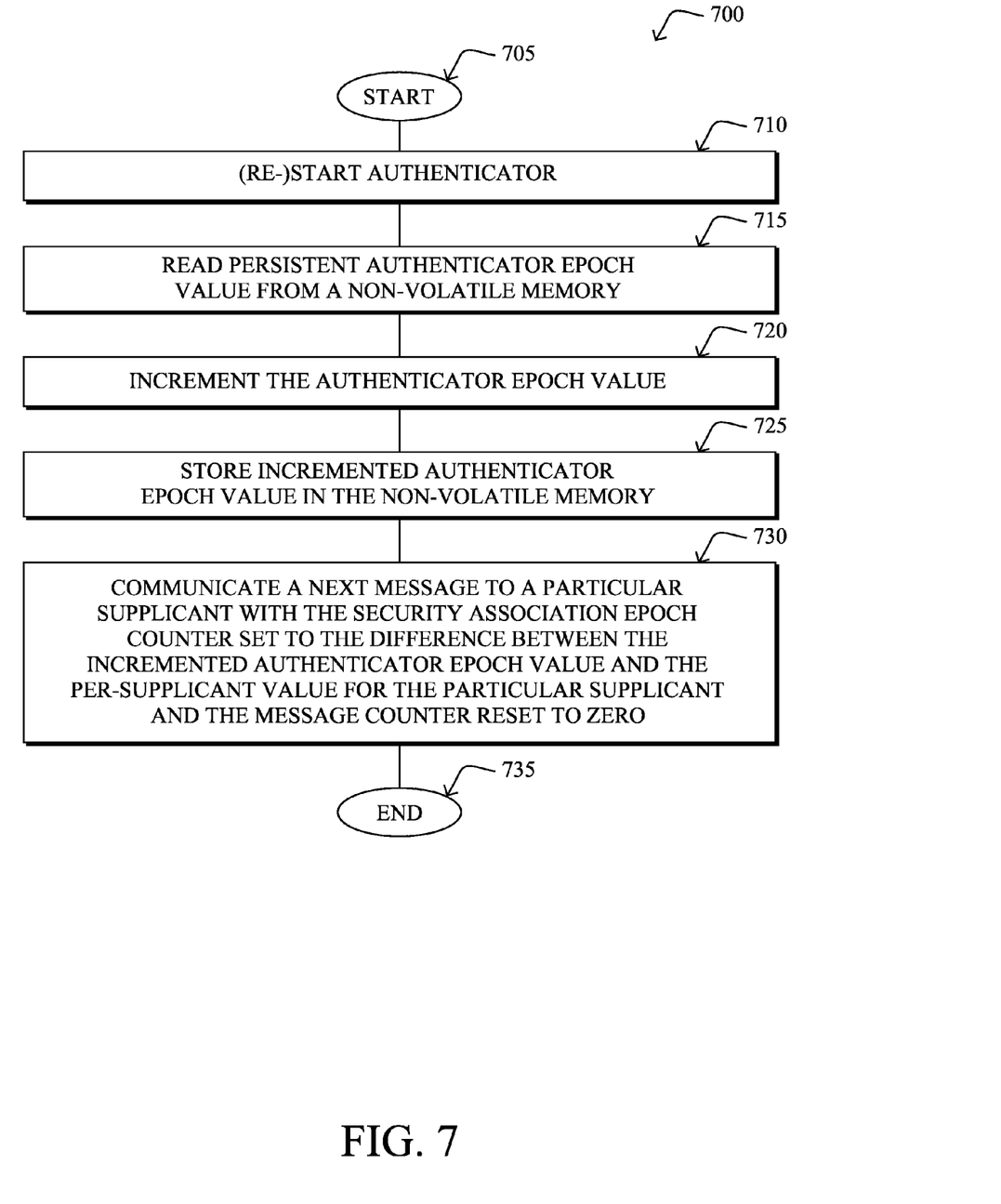
FIG. 7 illustrates another example simplified procedure for scalable replay counters for network security, particularly for starting and restarting the authenticator.

In addition, FIG. 7 illustrates another example simplified procedure for scalable replay counters for network security in accordance with one or more embodiments described herein, particularly for starting and restarting the authenticator. The procedure 700 may start at step 705, and continues to step 710, where, as described in greater detail above, an authenticator may either start or restart, at which time it reads the persistent authenticator epoch value 310 from a non-volatile memory 300 in step 715. The authenticator epoch value is then incremented in step 720, and stored in the non-volatile memory in step 725. As such, when communicating a next message to a particular supplicant in step 730, the security association epoch counter 422 is set to the difference between the incremented authenticator epoch value 310 and the per-supplicant value 320 for the particular supplicant 315, and the message counter 424 is reset to zero. The illustrative procedure 700 may then end in step 735, notably able to send additional messages with incremented counters, accordingly.

Figure 8:
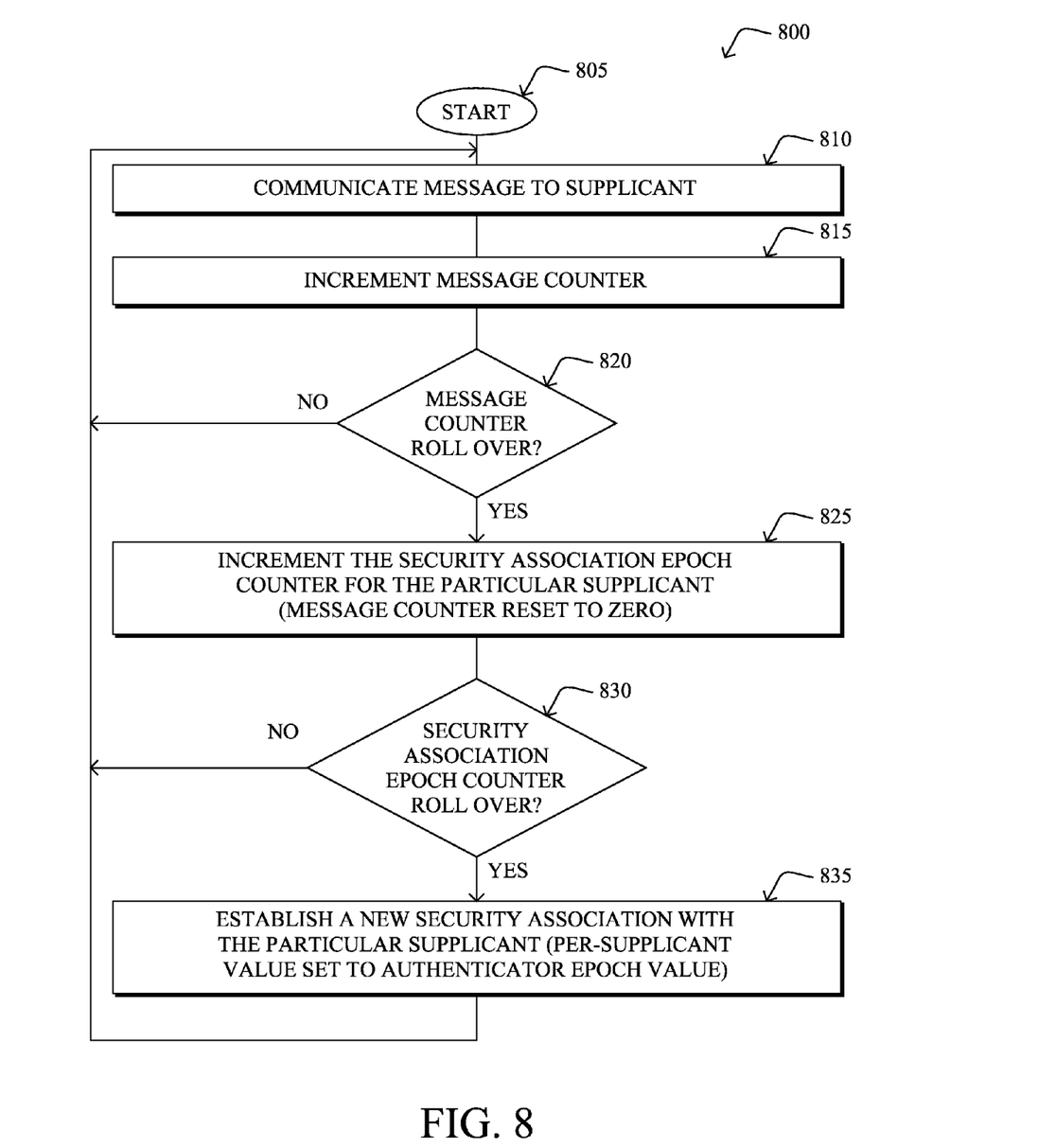
FIG. 8 illustrates another example simplified procedure for scalable replay counters for network security, particularly with respect to the replay counters.

Lastly, FIG. 8 illustrates another example simplified procedure for scalable replay counters for network security in accordance with one or more embodiments described herein, particularly with respect to the replay counters 420. The procedure 800 may start at step 805, and continues to step 810, where, as described in greater detail above, the authenticator (e.g., FAR) communicates a message 400 (e.g., GTK) to a particular supplicant (e.g., LLN node). Once the message is communicated, the authenticator increments the message counter 424 in step 815, and if rolled over in step 820 (e.g., is reset to zero), increments the security association epoch counter 422 for the particular is supplicant in step 825 (which, as noted above, may involve decrementing the per-supplicant value 320 or else incrementing the authenticator epoch value 310). In the event that in step 830 the security association epoch counter has also rolled over, then in step 835 the authenticator establishes a new security association with the particular supplicant, and the per-supplicant value 320 is set to the current authenticator epoch value 310. The procedure 800 may continue to communicate messages in step 810 according to the replay counter 420 derived from the techniques herein.

It should be noted that while certain steps within procedures 600-800 may be optional as described above, the steps shown in FIGS. 6-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-800 are described separately, certain steps from each procedure may be incorporated into each other procedure, and the procedures are not meant to be mutually exclusive.

The techniques described herein, therefore, provide for scalable replay counters for network security, particularly in a shared-media communication network. In particular, the techniques herein can allow an LLN to recover from a FAR reboot more quickly than traditional techniques, by persistently maintaining security associations and replay counters for every LLN device attached to the FAR. The techniques also provide a practical method that allows a FAR to persistently manage many (e.g., thousands of) replay counters without requiring a flash write operation whenever sending a message. Moreover, the techniques can maintain interoperability with existing protocols by utilizing the existing Replay Counter field in a standards-compliant way.

While there have been shown and described illustrative embodiments that provide for scalable replay counters for network security, it is to be understood that various other adaptations and modifications may be made within the spirit and scope of the embodiments herein. For example, the embodiments have been shown and described herein with relation to LLNs. However, the embodiments in their broader sense are not is as limited, and may, in fact, be used with other types of shared-media networks and/or protocols. In addition, while certain protocols are shown, such as various IEEE Std. protocols (e.g., 802.1x, 802.15.4 or 802.11i), other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   maintaining, at a processor of a computing device configured to operate as an authenticator in a communication network, a persistent authenticator epoch value that the authenticator increments each time the computing device reboots;
   maintaining, at the authenticator, a persistent per-supplicant value for each supplicant of the authenticator, each per-supplicant value set to a current value of the authenticator epoch value each time the corresponding supplicant establishes a new security association with the authenticator, wherein maintaining the persistent per-supplicant value for each supplicant comprises storing each persistent per-supplicant value with a corresponding pairwise temporal key (PTK) stored during each new security association; and
   transmitting at least one message from the authenticator to a particular supplicant, each message comprising a per-supplicant replay counter having a security association epoch counter and a message counter specific to the particular supplicant, wherein the security association epoch counter for each message is set as a difference between the authenticator epoch value and the per-supplicant value for the particular supplicant when the message is communicated, wherein the authenticator resets the security association epoch counter each time the corresponding supplicant establishes a new security association with the authenticator and the authenticator increments the security association epoch counter each time the authenticator reboots, and wherein the message counter is incremented for each message communicated;
   wherein the authenticator increments the security association epoch counter for the particular supplicant in response to the message counter rolling over; and wherein the authenticator must establish a new security association with the particular supplicant if the security association epoch counter rolls over.

2. The method as in claim 1, wherein maintaining the authenticator epoch value comprises, in response to starting the authenticator:
   reading the persistent authenticator epoch value from a non-volatile memory;
   incrementing the authenticator epoch value; and
   storing the incremented authenticator epoch value in the non-volatile memory.

3. The method as in claim 1, further comprising, in response to the authenticator being restarted:
   incrementing the authenticator epoch value; and
   transmitting, by the authenticator, a next message to the particular supplicant with the security association epoch counter set to the difference between the incremented authenticator epoch value and the per-supplicant value for the particular supplicant, and the message counter reset to zero.

4. The method as in claim 1, wherein the replay counter is eight bytes, and wherein the security association epoch counter is four bytes, and wherein the message counter is four bytes.

5. The method as in claim 1, further comprising:
   establishing the new security association with each supplicant using a 4-way handshake.

6. The method as in claim 1, wherein there is no difference between the authenticator epoch value and the per-supplicant value for the particular supplicant in response to establishing a new security association with the particular supplicant, and wherein the security association epoch counter is set to zero when there is no difference between the authenticator epoch value and the per-supplicant value.

7. The method as in claim 1, further comprising:
   rebooting the computing device based on a watchdog reset, and, in response, incrementing the authenticator epoch value.

8. An apparatus, comprising:
   one or more network interfaces to communicate with a shared-media communication network;
   a processor coupled to the network interfaces and adapted to execute one or more processes; and
   a memory configured to store a process executable by the processor, the process, when executed by the apparatus as an authenticator, operable to:
   maintain a persistent authenticator epoch value that increments each time the apparatus reboots;
   maintain a persistent per-supplicant value for each supplicant of the authenticator, each per-supplicant value set to a current value of the authenticator epoch value each time the corresponding supplicant establishes a new security association with the authenticator, wherein maintaining the persistent per-supplicant value for each supplicant comprises storing each persistent per-supplicant value with a corresponding pairwise temporal key (PTK) stored during each new security association; and
   transmit at least one message to a particular supplicant, each message using comprising a per-supplicant replay counter having a security association epoch counter and a message counter specific to the particular supplicant, wherein the security association epoch counter for each message is set as a difference between the authenticator epoch value and the per-supplicant value for the particular supplicant when the message is communicated, wherein the authenticator resets the security association epoch counter each time the corresponding supplicant establishes a new security association with the authenticator and the authenticator increments the security association epoch counter each time the authenticator reboots, and wherein the message counter is incremented for each message communicated;
   wherein the authenticator increments the security association epoch counter for the particular supplicant in response to the message counter rolling over; and wherein the authenticator must establish a new security association with the particular supplicant if the security association epoch counter rolls over.

9. The apparatus as in claim 8, wherein the process when executed to maintain the authenticator epoch value is further operable to, in response to starting the authenticator:
   read the persistent authenticator epoch value from a non-volatile memory;

increment the authenticator epoch value; and
store the incremented authenticator epoch value in the non-volatile memory.

10. The apparatus as in claim 8, wherein the process when executed is further operable to, in response to the authenticator being restarted:
increment the authenticator epoch value; and
transmit a next message to the particular supplicant with the security association epoch counter set to the difference between the incremented authenticator epoch value and the per-supplicant value for the particular supplicant and the message counter reset to zero.

11. The apparatus as in claim 8, wherein the replay counter is eight bytes, and wherein the security association epoch counter is four bytes, and wherein the message counter is four bytes.

12. The apparatus as in claim 8, wherein the apparatus is a field area router (FAR).

13. The apparatus as in claim 8, wherein the process when executed is further operable to:
establish the new security association with each supplicant using a 4-way handshake.

14. A tangible, non-transitory, computer-readable media having software encoded thereon, the software, when executed by a processor of a computing device acting as an authenticator in a computer network, operable to:
maintain a persistent authenticator epoch value that increments each time the computing device reboots;
maintain a persistent per-supplicant value for each supplicant of the authenticator, each per-supplicant value set to a current value of the authenticator epoch value each time the corresponding supplicant establishes a new security association with the authenticator, wherein maintaining the persistent per-supplicant value for each supplicant comprises storing each persistent per-supplicant value with a corresponding pairwise temporal key (PTK) stored during each new security association; and
transmit at least one message to a particular supplicant, each message using comprising a per-supplicant replay counter having a security association epoch counter and a message counter specific to the particular supplicant, wherein the security association epoch counter for each message is set as a difference between the authenticator epoch value and the per-supplicant value for the particular supplicant when the message is communicated, wherein the authenticator resets the security association epoch counter each time the corresponding supplicant establishes a new security association with the authenticator and the authenticator increments the security association epoch counter in response to the authenticator rebooting, and wherein the message counter is incremented for each message communicated;
wherein the authenticator increments the security association epoch counter for the particular supplicant in response to the message counter rolling over; and
wherein the authenticator must establish a new security association with the particular supplicant if the security association epoch counter rolls over.

* * * * *

UNITED STATES PATENT AND TRADEMARK OFFICE
CERTIFICATE OF CORRECTION

PATENT NO. : 9,077,772 B2
APPLICATION NO. : 13/451897
DATED : July 7, 2015
INVENTOR(S) : Hui et al.

It is certified that error appears in the above-identified patent and that said Letters Patent is hereby corrected as shown below:

In the specification,

In column 3, line 45, please amend as follows:
memory (e.g., no memory for storage other than for [[is]] pro- In column 4, line 65, please amend as follows:
[[is]] connected to IP networks by way of protocol translation In column 5, line 40, please amend as follows:
also that a tree is a kind of DAG, where each [[is]] device/node in In column 6, line 17, please amend as follows:
tion to only those devices that are allowed to participate [[is]] in In column 6, line 58, please amend as follows:
the root node in FIG. 1) to manage link-layer security [[is]]

In column 8, line 3, please amend as follows:
perform functions relating to the techniques [[is]] described In column 8, line 45, please amend as follows:
other words, whenever [[is]] the authenticator establishes a new In column 9, line 19, please amend as follows:
the number of [[is]] messages sent within the SA epoch of a In column 9, line 55, please amend as follows:
zero. That is, when restarting the authenticator, [[is]] the authen- Signed and Sealed this
Seventeenth Day of November, 2015

Michelle K. Lee
*Director of the United States Patent and Trademark Office*

CERTIFICATE OF CORRECTION (continued)
U.S. Pat. No. 9,077,772 B2

In column 10, line 30, please amend as follows:
    then the [[is]] authenticator epoch value 510 is incremented to 1,

In column 11, line 2, please amend as follows:
    being set to the authenticates [[is]] epoch value 510, and the

In column 12, line 18, please amend as follows:
    counter 422 for the particular [[is]] supplicant in step 825 (which,

In column 12, line 60, please amend as follows:
    sense are not [[is]] as limited, and may, in fact, be used with other